No. 794,332. PATENTED JULY 11, 1905.
C. T. ADAIR.
BROOM.
APPLICATION FILED MAR. 2, 1905.
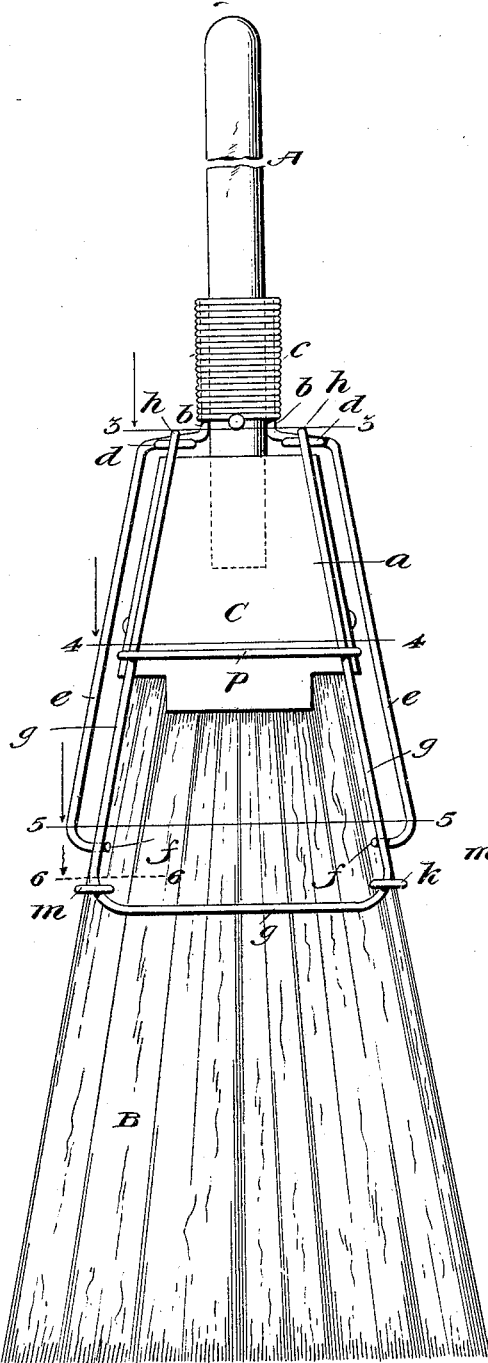
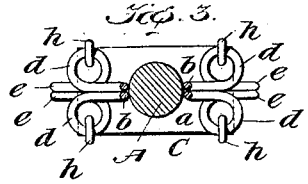
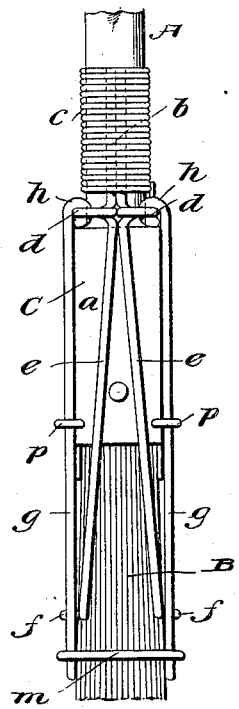
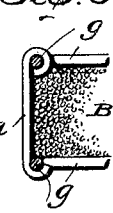
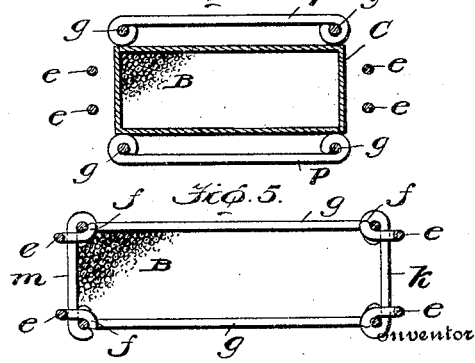
Witnesses
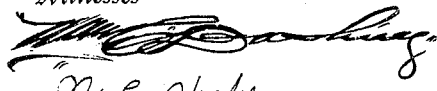
Inventor
C. T. Adair
By James Sheehy
Attorney No. 794,332.　　　　　　　　　　　　　　　　　　　　　Patented July 11, 1905.

UNITED STATES PATENT OFFICE.

CHARLES T. ADAIR, OF ADAIR, GEORGIA.

BROOM.

SPECIFICATION forming part of Letters Patent No. 794,332, dated July 11, 1905.

Application filed March 2, 1905. Serial No. 248,077.

*To all whom it may concern:*

Be it known that I, CHARLES T. ADAIR, a citizen of the United States, residing at Adair, in the county of Murray and State of Georgia, have invented new and useful Improvements in Brooms, of which the following is a specification.

My invention pertains to brooms; and it consists in the peculiar and advantageous construction hereinafter described, and particularly pointed out in the claims appended.

In the accompanying drawings, forming part of this specification, Figure 1 is a front elevation of the broom constituting the present and preferred embodiment of my invention. Fig. 2 is an edge elevation of the broom. Figs. 3, 4, and 5 are horizontal sections taken in the planes indicated by the lines 3 3, 4 4, and 5 5, respectively, of Fig. 1. Fig. 6 is a detail section taken in the plane indicated by the line 6 6 of Fig. 2 and illustrating the hook of the broom.

Similar letters designate corresponding parts in all of the views of the drawings.

Referring to the drawings, A is the stick or handle of the novel broom.

B is the straw, and C is the head for holding the straw and connecting the same to the stick or handle.

The head C in the present and preferred embodiment of my invention comprises a socket $a$, of sheet metal or other suitable material, fixed on the lower portion of the stick A, arms $b$, of galvanized wire or other suitable material, connected by a wire wrapping $c$ to the stick at a point slightly above the socket $a$ and having eyes $d$ and also having depending portions $e$, terminating in inwardly-extending portions $f$, U-shaped side members $g$, of galvanized wire or other suitable material, arranged at opposite sides of the socket $a$ and having hooks $h$ at their ends engaging the eyes $d$ of the arms $b$, a link $k$, preferably of galvanized wire, connecting the lower portions of the members $g$ and disposed at one edge of the straw B, and a hook $m$, pivotally connected to the lower portion of one member $g$ and arranged to be detachably engaged with the lower portion of the other member $g$ after the manner best shown in Fig. 6. The said head also preferably comprises bars $p$, which are disposed at opposite sides of the socket $a$ and are connected to the upwardly-extending portions of the U-shaped members $g$, as best shown in Fig. 4 of the drawings.

In assembling the parts of my improved broom the hook $m$ is disengaged from one of the U-shaped members $g$, when, as will be readily observed, one side of one member $g$ may be moved away from the corresponding side of the other member $g$. With this done the mass of straw B may be readily passed upwardly between the members $g$ and into the socket $a$, after which the hook $m$ is re-engaged with the first-mentioned member $g$.

As a result of this it will be seen that the members $g$ will be held under pressure against opposite sides of the mass of straw and will securely hold the upper portion of the said mass in the socket $a$, and hence against lateral spreading. It will also be observed that the members $g$ will hold the inwardly-extending portions $f$ of the depending portions $e$ on arms $b$ against opposite sides of the mass of straw, and thereby enable said portions $f$ to assist in the retention of the straw in the socket $a$. The portions $e$ serve as fenders to protect the opposite edges of the broom when the same is struck against any object. From the foregoing it follows that when the mass of straw in the broom is worn to such an extent as to be useless the said mass may be readily removed from the head and as readily replaced with a new mass of straw, and this without the employment of skilled labor or tools of any description.

Having described my invention, what I claim, and desire to secure by Letters Patent, is—

1. In a broom, the combination of a stick, a mass of straw, and a head comprising a socket arranged on the stick and open at its lower end so as to receive the upper portion of the mass of straw, arms connected to the stick above the socket and having eyes, U-shaped members pivotally connected with the eyes of the arms and disposed at opposite sides of the mass of straw, a link arranged at one edge of the mass of straw and connecting the U-shaped members, and a hook arranged at the opposite edge of the mass of straw and pivotally connected to one U-shaped member and adapted to be swung into and out of engagement with the other U-shaped member.

2. In a broom, the combination of a stick, a mass of straw, and a head comprising a socket arranged on the stick and open at its lower end so as to receive the upper portion of the mass of straw, arms connected to the stick above the socket and having eyes and also having depending portions terminating in inwardly-directed portions, U-shaped members pivotally connected with the eyes of the arms and disposed outside of the inwardly-directed portions on the depending portions of the arms and at opposite sides of the mass of straw and having bars connecting their upwardly-extending portions, a link arranged at one edge of the mass of straw and connecting the U-shaped members, and a hook arranged at the opposite edge of the mass of straw and pivotally connected to one U-shaped member and adapted to be swung into and out of engagement with the other U-shaped member.

In testimony whereof I have hereunto set my hand in presence of two subscribing witnesses.

CHARLES T. ADAIR.

Witnesses:
  C. C. HOWELL,
  C. A. HOWELL.